United States Patent
Garrison et al.

(10) Patent No.: US 9,894,152 B2
(45) Date of Patent: Feb. 13, 2018

(54) CONSOLIDATION AND MONITORING OF CONSUMED CONTENT

(71) Applicant: ARRIS Enterprises, Inc., Suwanee, GA (US)

(72) Inventors: William J. Garrison, Warminster, PA (US); Albert F. Elcock, West Chester, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 49 days.

(21) Appl. No.: 14/810,810

(22) Filed: Jul. 28, 2015

(65) Prior Publication Data
US 2017/0034261 A1    Feb. 2, 2017

(51) Int. Cl.
H04L 29/08    (2006.01)
H04L 29/06    (2006.01)
H04L 12/28    (2006.01)

(52) U.S. Cl.
CPC ...... *H04L 67/1044* (2013.01); *H04L 12/2803* (2013.01); *H04L 65/4076* (2013.01); *H04L 65/4084* (2013.01); *H04L 65/605* (2013.01); *H04L 67/16* (2013.01)

(58) Field of Classification Search
USPC .................................................. 709/223, 201
See application file for complete search history.

(56) References Cited

U.S. PATENT DOCUMENTS

| | | | | |
|---|---|---|---|---|
| 9,414,123 | B2* | 8/2016 | Yie | H04H 20/18 |
| 2006/0215630 | A1* | 9/2006 | Hwang | H04L 12/1827 370/351 |
| 2008/0086754 | A1* | 4/2008 | Chen | H04L 29/06027 725/105 |
| 2008/0168117 | A1* | 7/2008 | Coates | G06F 17/30867 709/201 |
| 2011/0087647 | A1* | 4/2011 | Signorini | G06F 17/30867 707/709 |
| 2012/0151383 | A1* | 6/2012 | Kazan | G06Q 10/101 715/753 |
| 2014/0123161 | A1* | 5/2014 | van Coppenolle | H04L 65/4076 725/8 |
| 2014/0155174 | A1* | 6/2014 | Laakkonen | A63F 13/12 463/42 |
| 2014/0229289 | A1* | 8/2014 | Rao | G06Q 30/0241 705/14.66 |
| 2014/0365501 | A1* | 12/2014 | Ueno | H04L 67/2842 707/747 |
| 2015/0106578 | A1* | 4/2015 | Warfield | G06F 3/0613 711/158 |
| 2015/0169883 | A1* | 6/2015 | Choi | G06F 21/606 726/26 |

(Continued)

*Primary Examiner* — Jude Jean Gilles
(74) *Attorney, Agent, or Firm* — Bart A. Perkins

(57) ABSTRACT

Methods, systems, and computer readable media can be operable to facilitate the generation of an interface showing content being consumed by a group of devices. A central device may gather secondary streams of content consumed by each device within the group of devices, and the secondary streams may be used to generate an interface comprising thumbnails showing content consumed by the device associated with the respective thumbnail. Secondary streams of content may be generated at the central device or may be retrieved by the central device from a client device serviced by the central device.

20 Claims, 5 Drawing Sheets

(56) References Cited

U.S. PATENT DOCUMENTS

| | | | |
|---|---|---|---|
| 2015/0195620 A1* | 7/2015 | Buchner | H04N 21/4788 725/141 |
| 2016/0065625 A1* | 3/2016 | Ouyang | H04L 65/403 715/753 |

* cited by examiner

CONSOLIDATION AND MONITORING OF CONSUMED CONTENT

TECHNICAL FIELD

This disclosure relates to monitoring content being consumed.

BACKGROUND

Content continues to be made available for consumption on a multitude of various devices. Users typically have the capability to access content at a plurality of devices within a subscriber premise and the content may be provided to a user through various transmission standards and mediums. For example, users may receive content such as broadcast television content (e.g., content delivered to a plurality of subscribers over one or more downstream channels), video-on-demand (VoD) content, streaming content (e.g., YouTube, Netflix, web-page content etc.), recorded content (e.g., content stored at a digital video recorder (DVR)), and other types of content. Users may consume (e.g., receive, display, record, otherwise interact with, etc.) content through various devices such as a set-top box (STB), television, computer, tablet, mobile device, gaming device, and others. With the continued growth and mixture of content consuming devices within a premise, it is desirable to improve upon systems and methods for monitoring content being consumed within the premise.

Generally, a home network provides multiple services to a subscriber, and the multiple services are often being accessed by a subscriber at the same time. For example, a subscriber might be viewing a broadcast television show through a STB, while a gateway device records a program. At the same time, another member of the subscriber's family might be viewing a different broadcast television show through a different STB, or streaming a movie through a Netflix application on a mobile device. While the subscriber's home network is carrying out this plurality of functions, the subscriber is unable to monitor everything that the home network is doing. Therefore, it is desirable to improve upon methods and systems for monitoring content consumed by a group of devices.

BRIEF DESCRIPTION OF THE DRAWINGS

Like reference numbers and designations in the various drawings indicate like elements.

DETAILED DESCRIPTION

Figure 1:
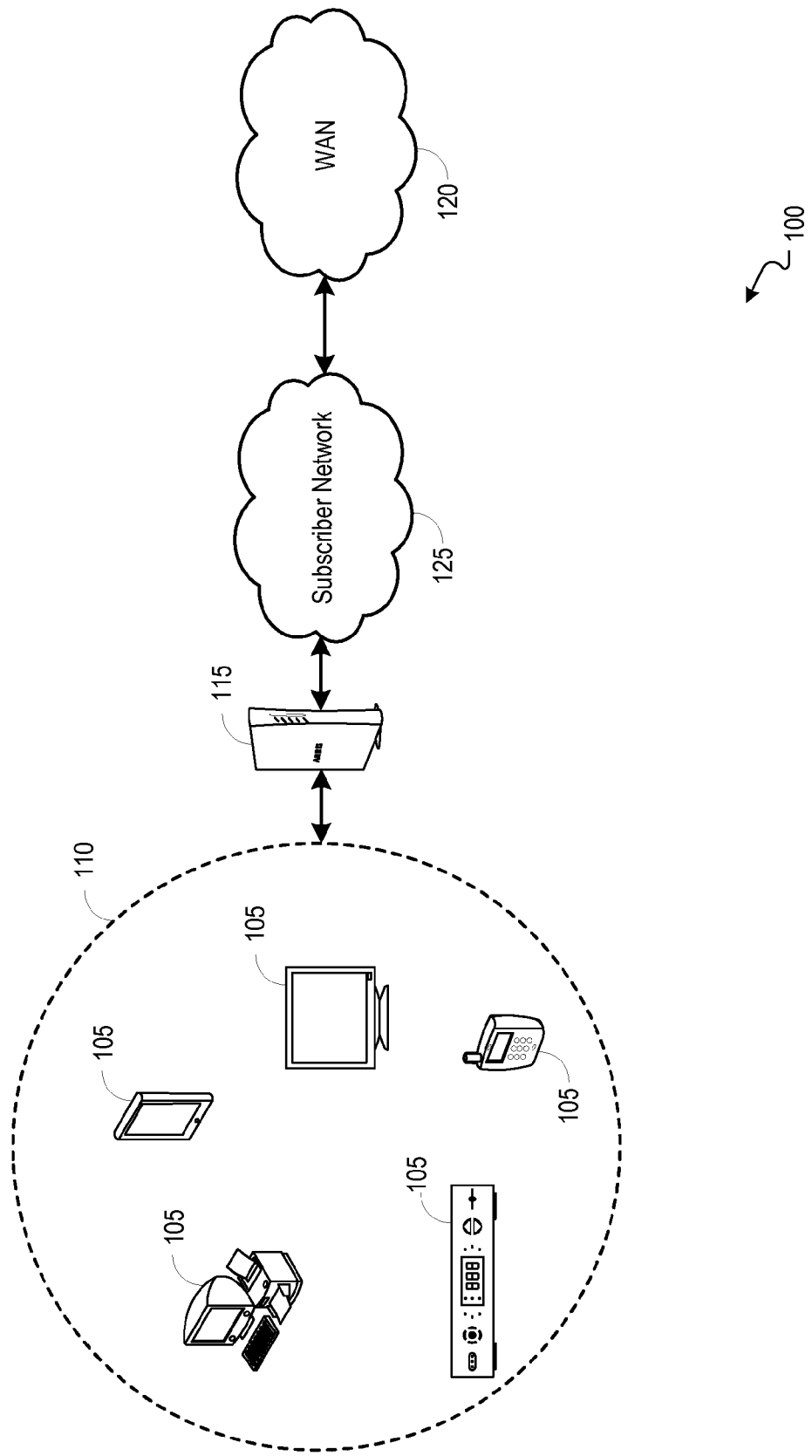
FIG. 1 is a block diagram illustrating an example network environment operable to facilitate the display of a consolidation of content being consumed by a group of shared devices.

It is desirable to improve upon methods and systems for monitoring content consumed (e.g., received, displayed, recorded, otherwise interacted with, etc.) by a group of devices. The methods, systems, and computer readable media described in this disclosure can be operable to facilitate the generation of an interface showing content being consumed by a group of devices. A central device may gather secondary streams of content consumed by each device within the group of devices, and the secondary streams may be used to generate an interface comprising thumbnails showing content consumed by the device associated with the respective thumbnail. Secondary streams of content may be generated at the central device or may be retrieved by the central device from a client device serviced by the central device.

Described herein is an interface, a mosaic display, which displays the content that a group of devices (e.g., a home system, etc.) is currently consuming at a plurality of terminals. Content may be delivered to the plurality of terminals through a central device (e.g., a gateway device), and the central device can create an overview of all (or as much as is possible) the content being currently displayed or being recorded within an associated premise. The overview may then be displayed to a user by outputting the overview to a client device or any other display within or outside of the premise.

An embodiment of the invention described herein may include a method comprising: (a) identifying at a central device, one or more devices within a group of shared devices; (b) retrieving a secondary stream of each piece of content consumed by one or more of the identified devices within the group of shared devices; (c) generating an interface comprising one or more thumbnails, wherein each thumbnail is associated with one or more of the identified devices within the group of shared devices, and wherein a retrieved secondary stream associated with content consumed by an identified device is output as a display within a thumbnail associated with the respective device; and (d) outputting the generated interface.

According to an embodiment of the invention, content consumed by one or more of the identified devices comprises content output from the central device to one or more of the identified devices and content being recorded at the central device.

According to an embodiment of the invention, a content stream associated with a piece of content consumed by one or more of the identified devices is duplicated to create a secondary stream associated with the piece of content.

According to an embodiment of the invention, content consumed by one or more of the identified devices comprises content that is received by one or more of the identified devices without passing through the central device, wherein the secondary stream for each piece of content may be retrieved from the one or more identified devices.

According to an embodiment of the invention, the generated interface is output to a device as a Moving Picture Experts Group stream.

According to an embodiment of the invention, the group of shared devices comprises a plurality of devices serviced by the central device.

An embodiment of the invention described herein may include an apparatus comprising: (a) a module configured to be used to: (i) identify one or more devices within a group of shared devices; (ii) retrieve a secondary stream of each piece of content consumed by one or more of the identified devices within the group of shared devices; and (iii) generate an interface comprising one or more thumbnails, wherein each thumbnail is associated with one or more of the identified devices within the group of shared devices, and wherein a retrieved secondary stream associated with content consumed by an identified device is output as a display within a thumbnail associated with the respective device; and (b) an interface configured to be used to output the generated interface.

An embodiment of the invention described herein may include one or more non-transitory computer readable media having instructions operable to cause one or more processors to perform the operations comprising: (a) identifying at a central device, one or more devices within a group of shared devices; (b) retrieving a secondary stream of each piece of content consumed by one or more of the identified devices within the group of shared devices; (c) generating an interface comprising one or more thumbnails, wherein each thumbnail is associated with one or more of the identified devices within the group of shared devices, and wherein a retrieved secondary stream associated with content consumed by an identified device is output as a display within a thumbnail associated with the respective device; and (d) outputting the generated interface.

FIG. 1 is a block diagram illustrating an example network environment 100 operable to facilitate the display of a consolidation of content being consumed by a group of devices. In embodiments, video, voice, and/or data services may be delivered to one or more client devices 105. Client devices 105 may include a television, mobile device, tablet, computer, set-top box (STB), gaming device, and any other device operable to receive video, voice, and/or data services. It should be understood that various multimedia services may be delivered to the client devices 105, including but not limited to, live or broadcast television, video-on-demand (VoD) content, pay-per view content, recorded content (e.g., DVR content), audio-only content, and streaming content such as YouTube or Netflix content. It should be further understood that the devices shown in FIG. 1 may be integrated. For example, a television may be connected to and controlled by a STB.

Multiple services may be delivered to client devices 105 over a local network 110. The local network 110 may include a local area network (LAN), wireless local area network (WLAN), personal area network (PAN), mobile hotspot network, and others. The local network 110 may be provided at a subscriber premise by a central device 115. The central device 115 may include a gateway device, modem device, combination thereof or other access device. It will be appreciated by those skilled in the relevant art that delivery of the multiple services over the local network 110 may be accomplished using a variety of standards and formats.

In embodiments, one or more client devices 105 associated with a subscriber and/or premise may be referred to as a group of shared devices. For example, a group of shared devices may include each of one or more client devices 105 that are serviced by a common central device 115, each of one or more client devices 105 that are associated with a common subscription, subscriber, and/or premise, one or more other central devices 115 (e.g., central devices associated with a common subscription, subscriber and/or premise, and client devices 105 connected to the central device (s)), and other devices associated with the subscriber and/or premise.

In embodiments, multiple services (e.g., video, voice, and/or data services) may be delivered from a wide-area network (WAN) 120 to the local network 110 through a connection to a subscriber network 125. The subscriber network 125 may include an optical network, hybrid fiber coaxial (HFC) network, twisted-pair, mobile network, high-speed data network, and others. Multiple systems operator (MSO) devices and/or networks within the WAN 120 may be used to provide, manage, and/or troubleshoot the multiple services provided to subscribers.

It will be appreciated by those skilled in the relevant art that client devices 105 may be capable of interacting and communicating with each other and/or with a central device 115 over various wireless communication standards (e.g., Wi-Fi, Bluetooth, etc.) or wired communication standards (e.g., Ethernet, Multimedia over Coax Alliance (MoCA), etc.). Client devices 105 connected to a local network 110 may receive services according to one or more subscriptions entered into between a subscriber and service provider.

In embodiments, a client device 105 may be configured to provide a subscriber with an interface for monitoring and/or managing content received and displayed by one or more other client devices 105. For example, a subscriber can access an application through a client device 105, wherein the subscriber can view other client devices 105 which can be managed through the application and can identify content being displayed on the other client devices 105.

A subscriber can initiate at a client device 105 or central device 115, an application configured to consolidate and display content recorded, received, and/or displayed at one or more other client devices 105. In embodiments, when a subscriber initiates the application, a message can be sent from the initiating client device 105 to a content consolidation application. The content consolidation application may generate a mosaic display showing each piece of content being consumed by a group of shared devices. The content consolidation application may exist at a central device 115 or at an external device or server (e.g., server or device within a premise, server or device within the cloud, etc.).

In response to the message received from the initiating client device 105, the content consolidation application can identify and retrieve content being consumed by a group of shared devices. For example, a central device 115 can identify each of one or more client devices 105 within a group of shared devices associated with the central device 115 and/or the subscriber initiating the application.

The central device 115 may store or otherwise access information associated with client devices 105 under the control of a subscriber, content provided to the client devices 105, and subscription information associated with the client devices 105. It should be understood that the information identifying content provided to client devices and/or subscription information may be located at a network back office (e.g., server or application connected to the WAN 120), or may be located within a subscriber premise (e.g., server or application connected to the local network 110).

In embodiments, the central device 115 can maintain a list of client devices 105 that are connected to the central device 115, are serviced by the central device 115, and/or are otherwise associated with a common premise, subscription, and/or subscriber. For example, the central device 115 can periodically request connection updates from client devices 105 or can receive notification when a client device 105 joins the local network 110.

The central device 115 can maintain and/or access current status information associated with each client device 105 (e.g., power state, tuning state, content displayed). For example, the central device 115 may periodically request state information and/or tuning/content information from each of the client devices 105 or the central device 115 may receive status updates from a client device when the client device experiences a power state change (e.g., powers up or down) or when the client device tunes to a different channel or content source. It will be appreciated by those skilled in the relevant art that the central device 115 can use various communication techniques and methods to maintain a current list of client devices and corresponding status information.

The central device 115 can maintain subscription information associated with one or more client devices 105 or a subscriber associated with the client devices 105. For example, the central device 115 may have access to subscription information (e.g., internally or through a connection to an external server), and can determine what services and/or programming is available to a client device 105 or subscriber by looking up the corresponding subscription information.

In embodiments, the content consolidation application can retrieve information from a central device 115 and can respond to the initiating client device 105 by sending the client device 105 information associated with the one or more client devices 105 within the group of shared devices and content provided to, displayed by, and/or recorded by the client devices. An interface displayed or output by the initiating client device 105 can show each of the one or more client devices 105 within the group of shared devices. The interface may also show information associated with the content (e.g., program information such as title, channel, summary, etc.) currently being displayed at each of the client devices 105. Each of the client devices 105 may be listed within the interface as a thumbnail (e.g., window or tile), and each thumbnail may be displayed as a screenshot or secondary display of content currently being consumed on the associated client device 105. For example, the interface may display content being output at one or more of the client devices 105 as the content is being displayed by each client device 105. It should be understood that each client device 105 may consume (e.g., receive, display, record, etc.) more than one content stream at any given time.

In embodiments, the central device 115 can identify and capture content being streamed to one or more client devices 105 through the central device 115. The central device 115 can identify broadcast content (e.g., content received along a downstream channel and routed by the central device 115 to a client device 105) or recorded content (e.g., content stored locally at the central device 115) that is output from the central device 115 to one or more client devices 105. For example, a tuner within the central device 115 may be tuned to a channel providing content for display at a client device 105. The central device 115 may duplicate or split the content stream being output from the central device 115 to the client device 105, and the secondary stream (e.g., the duplicated or split content stream) may be used, for example, by a content consolidation application to display the content through a thumbnail associated with the client device. It should be understood that the secondary stream may be transcoded or the resolution of the secondary stream may be otherwise lowered such that a thumbnail image of the content may be displayed without over-burdening system resources. For example, a transcoder may be configured to convert a content stream into a low resolution secondary stream having a lower bitrate than the full resolution content stream.

In embodiments, the central device 115 may identify and capture Internet protocol (IP) content that is being output from the central device 115 to one or more client devices 105. For example, the central device 115 may duplicate or split the IP content stream, and the secondary stream may be used, for example, by a content consolidation application to display the content through a thumbnail associated with the client device(s) 105 consuming the content. It will be appreciated by those skilled in the relevant art that the secondary stream may be transcoded such that the stream can be used by the content consolidation application in the generation of the interface.

In embodiments, the central device 115 may determine that IP content being output from the central device 115 to one or more client devices 105 is formatted or encrypted such that the central device 115 is unable to generate a secondary stream of the IP content. The central device 115 may output a request for a secondary stream of the IP content to one or more client devices 105 receiving the IP content. In response to the request for the secondary stream, one or more of the client devices 105 can generate and output a secondary stream of the IP content to the central device 115. The secondary stream may be a low-resolution stream.

In embodiments, the central device 115 can record and store content based on a request received from a user and/or client device 105, wherein the request identifies specific content that is to be recorded. The central device 115 may identify content that is being recorded by the central device 115 and content that is scheduled to be recorded by the central device 115, and the central device 115 may identify a client device 105 that requested the content be recorded. For example, a tuner within the central device 115 may be tuned to a channel providing content that is being recorded. The central device 115 may duplicate or split the content stream that is being recorded, and the secondary stream (e.g., the duplicated or split content stream) may be used, for example, by a content consolidation application to display the content through a thumbnail associated with the central device 115 and/or a client device 105 that requested the content be recorded. It should be understood that the secondary stream may be transcoded or the resolution of the secondary stream may be otherwise lowered such that a thumbnail image of the content may be displayed without over-burdening system resources.

In embodiments, the central device 115 may identify and capture content that is being received by one or more client devices 105 through a different central device and/or network (e.g., mobile device or tablet receiving content over a mobile network or high-speed wireless data network). Content received by a client device 105 from a different central device or network may include IP content streamed from a wireless data network, content being recorded at different central device, content stored at a location other than the central device 115, content generated by a device within a premise (e.g., security camera feed), and any other content not being output from the central device 115. A central device 115 may sniff home network traffic to identify content being received by client devices 105 from a different source. It will be appreciated by those skilled in the relevant art that various communication techniques, methods and standards may be used to allow the one or more client devices 105 and central device 115 to communicate with each other. For example, the one or more client devices 105 can output a message to the central device 115 identifying content being received, displayed, and/or recorded by the one or more client devices 105.

In embodiments, when retrieving thumbnail content for display within an interface showing content consumed by a group of shared devices, the central device 115 can output a message to each of the client devices 105 receiving content from an alternate device or source, wherein the message requests that the client devices 105 stream or otherwise transmit consumed content to the central device 115. For example, the client devices 105 may output a secondary, low-resolution content stream to the central device 115. The client devices 105 may continuously output a secondary stream to the central device 115, or the client devices 105 may output a secondary stream to the central device 115 only when the content consolidation application is active.

In embodiments, an interface showing content consumed by a group of shared devices may be generated by an external server. The server can gather information associated with content displayed at each client device 105 within the group of shared devices, and the server can deliver the gathered information to a central device 115 and/or a client device 105. The server can generate an interface that includes real-time feeds of the content being consumed by the group of shared devices, and the server can output the generated interface to a central device 115 and/or a client device 105 (e.g., through a unicast stream). It should be understood that the server may be within a subscriber premise or outside of the premise (e.g., at a headend, in the cloud, connected to the WAN 120, etc.).

In embodiments, the interface showing content consumed by a group of shared devices may be output to the initiating client device 105, or any other display device, from the central device 115 as a Moving Picture Experts Group (MPEG) stream. For example, the interface may be received by a client device 105 when the client device 105 is tuned to a specific channel that is designated for outputting the interface. The interface may be requested by and output to a client device 105 using Hypertext Transfer Protocol (HTTP) communications (e.g., HTTP GET, HTTP POST, etc.). It should be understood that the interface showing content consumed by the group of shared devices may be retrieved by a device outside of a premises or local network 110 (e.g., a mobile device, tablet, external server/application, etc.).

Figure 2:
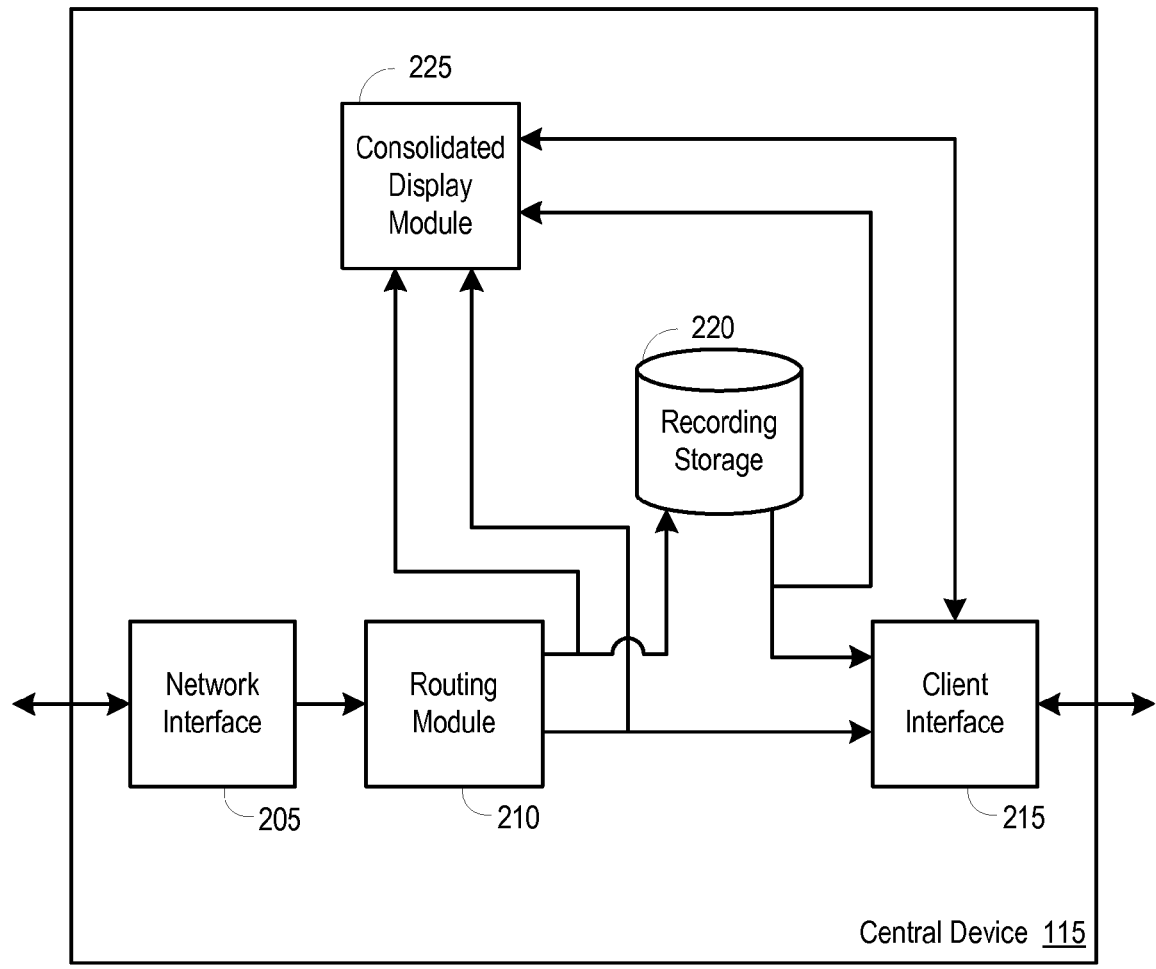
FIG. 2 is a block diagram illustrating an example central device operable to facilitate the display of a consolidation of content being consumed by a group of shared devices.

FIG. 2 is a block diagram illustrating an example central device 115 operable to facilitate the display of a consolidation of content being consumed by a group of devices. The central device may be a central device 115, or any other device having an application operable to retrieve content streamed to a group of shared devices and generate a display of consolidated content. The central device 115 may include a network interface 205, a routing module 210, a client interface 215, recording storage 220, and a consolidated display module 225. In embodiments, the consolidated display module 225 may reside within the central device 115, a client device 105 of FIG. 1, a server or application within a premise or local network, a server or application within an upstream network (e.g., subscriber network 125 of FIG. 1, WAN 120 of FIG. 1, etc.), or any other suitable location.

In embodiments, content may be received by a central device 115 through a network interface 205. The central device 115 may receive content from an upstream network (e.g., subscriber network 125 of FIG. 1, WAN 120 of FIG. 1, etc.), and the received content may include broadcast content, VoD content, IP content, and any other content delivered to the central device 115 over one or more downstream channels or content output from the central device 115.

In embodiments, a routing module 210 may route content from one or more downstream channels to one or more destinations. For example, the routing module 210 may include one or more tuners, and each tuner may be tuned to a downstream channel to receive content delivered to the central device 115 over the respective downstream channel. Requested content may be streamed from the routing module to a requesting client device through the client interface 215. Content that is to be recorded by the central device 115 may be streamed from the routing module 210 into storage at recording storage 220. A client device 105 may request and receive recorded content from the central device 115, and the central device 115 can stream the requested recorded content from recording storage 220 to the requesting client device 105 through the client interface 215.

In embodiments, a consolidated display module 225 may retrieve secondary streams of content being consumed by devices within a group of shared devices. The consolidated display module 225 may retrieve a secondary stream of content that is being streamed to one or more client devices 105, wherein the secondary stream is split from or is a duplication of the content being streamed to the respective client devices 105. The consolidated display module 225 may retrieve a secondary stream of content that is being recorded at the central device 115, wherein the secondary stream is split or is a duplication of the content being streamed and stored at recording storage 220. The consolidated display module 225 may retrieve a secondary stream of recorded content that is being streamed to one or more client devices 105, wherein the secondary stream is split or is a duplication of the recorded content being streamed to the one or more respective client devices 105 from recording storage 220.

In embodiments, the consolidated display module 225 may retrieve secondary streams associated with content received by one or more client devices 105 from a device and/or network other than the central device 115. The consolidated display module 225 may periodically or conditionally output a request for secondary streams to client devices 105 through the client interface 215. A client device 105 may output a secondary stream of received content to the central device 115 when the client device 105 receives content from a device or network other than the central device 115. It should be understood that various communication techniques and protocols may be used to establish rules for delivering a secondary stream from a client device 105 to a central device 115.

In embodiments, a transcoder within the central device 115 or a transcoder existing at another device may be configured to convert a content stream into a low resolution secondary stream having a lower bitrate than the full resolution content stream. It will be appreciated by those skilled in the relevant art that various techniques for transcoding may be used, such as decoding and re-encoding into the lower resolution format, and/or dropping several types of information bits in the data.

In embodiments, the consolidated display module 225 may generate an interface displaying content being consumed by a group of shared devices. The interface may include one or more thumbnails, wherein each thumbnail is associated with a client device 105 and the thumbnail includes a display of the content being consumed by the associated client device 105. The content displayed within a thumbnail, also referred to herein as thumbnail content, may be a display of a secondary stream of content. It will be appreciated by those skilled in the relevant art that the secondary stream may be formatted using various protocols and standards to create a display of the associated content within a thumbnail of the interface.

In embodiments, the consolidated display module 225 may output the generated interface to one or more client devices 105 through the client interface 215. The interface showing content consumed by a group of shared devices may be output to the initiating client device 105, or any other display device, from the central device 115 as a Moving Picture Experts Group (MPEG) stream. For example, the interface may be received by a client device 105 when the client device 105 is tuned to a specific channel that is designated for outputting the interface. The interface may be streamed to the client device 105 from the consolidated display module 225 when the client device 105 tunes to the designated channel. The interface may be requested by and output to a client device 105 using HTTP communications (e.g., HTTP GET, HTTP POST, etc.).

Figure 3:
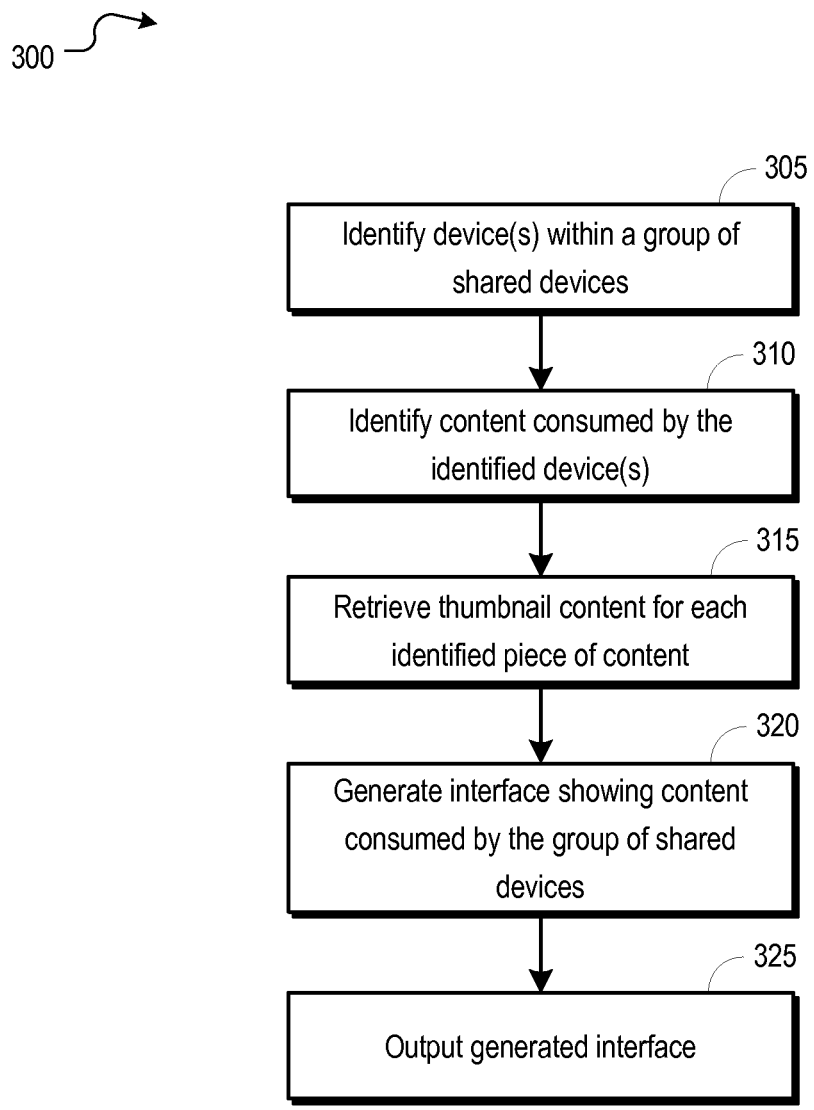
FIG. 3 is a flowchart illustrating an example process operable to facilitate the display of a consolidation of content being consumed by a group of shared devices.

FIG. 3 is a flowchart illustrating an example process 300 operable to facilitate the display of a consolidation of content being consumed by a group of devices. The process 300 can begin at 305, when a request for information associated with content consumed by a group of shared devices is received from a device (e.g., central device 115 of FIG. 1, client devices 105 of FIG. 1). For example, a central device 115 (e.g., gateway device, modem device, combination thereof, server, or other access device) can receive the request from a client device 105 via a local network interface (e.g., local network 110 of FIG. 1), or other network. In embodiments, the request may include information identifying the client device from which the request was sent, and one or more other client devices associated with the client device. For example, the one or more associated client devices may include devices within the same group of shared devices (e.g., devices having a common premise, subscriber, subscription, etc.).

At 305, one or more devices (e.g., central device 115, client devices 105, etc.) that are within a group of shared devices can be identified. The one or more devices within a group of shared devices may be identified, for example, by the central device 115. In embodiments, the group of shared devices can include one or more client devices 105 connected to and/or serviced by one or more associated central devices 115, and/or one or more client devices 105 associated with a common subscription, subscriber, and/or premise. For example, based on information received from a requesting device, the central device 115 can identify a subscriber associated with the requesting device, and the central device 115 can access subscription information to identify client devices associated with the subscriber as the one or more client devices within the group of shared devices. The central device 115 can use subscription information to identify a physical address (e.g., street address) associated with the requesting device, and the central device 115 can identify client devices associated with the physical address as the one or more client devices within the group of shared devices. The central device 115 can maintain a list of client devices 105 that have been and/or that currently are connected to and/or serviced by the central device 115.

At 310, content consumed by the devices within the group of shared devices can be identified. Content consumed by the devices can be identified, for example, by the central device 115. Identified content may include, for example, broadcast content streamed to one or more client devices 105 from the central device 115, recorded content (e.g., DVR content) output from the central device 115 to one or more client devices 105, content being recorded by the central device 115 or by one or more other devices, IP content being streamed from the central device 115 to one or more client devices 105, content being streamed to one or more client devices 105 from a device and/or network other than the central device 115 (e.g., content streamed to a device from a mobile network, content streamed to a client device from storage external to the central device 115, etc.), and/or other content.

A central device 115 may identify content being received at the central device 115 and streamed from the central device 115 to one or more client devices 105. It will be appreciated by those skilled in the relevant art that a client device 105 can communicate with a central device 115 to provide information to the central device 115 identifying content received by the client device 105 from a device and/or network other than the central device 115. For example, a communication protocol or technique may be used wherein the central device 115 periodically queries client devices 105 for identification of content being received, or a client device 105 informs the central device 115 when a change occurs in the content being received by the client device 105.

At 315, thumbnail content can be retrieved for each identified piece of content consumed by the group of shared devices. Thumbnail content may include a secondary stream (e.g., a split or duplicated stream of a content stream provided to a client device) of content streamed to a client device 105, and the thumbnail content may be displayed within a thumbnail associated with the client device 105 receiving the content. In embodiments, content that is output from the central device 115 to a client device 105 can be used to generate an interface displaying consolidated content. For example, the central device 115 can create a secondary stream by splitting or duplicating a content stream that is being recorded or output to a client device. A secondary stream may be split or duplicated from broadcast content received at a central device 115 (e.g., broadcast content stream being output from the central device 115 to one or more client devices 115, broadcast content stream being recorded at the central device 115, etc.), IP content received at a central device 115, recorded content being streamed from the central device 115 to one or more client devices 105, and any other content being processed by the central device 115. It should be understood that the secondary stream may be transcoded or the resolution of the secondary stream may be otherwise lowered such that a thumbnail image of the content may be displayed without over-burdening system resources.

In embodiments, client devices 105 can output displayed content to the central device 115 for the central device 115 to use in generating an interface displaying consolidated content. For example, when a client device 105 receives content from a device and/or network other than the central device 115, the client device 105 may create a secondary stream of the received content and output the secondary stream to the central device 115. It should be understood that various communication techniques, protocols, and standards may be used such that the central device 115 periodically or conditionally (e.g., upon initiation of a consolidated content display) receives a secondary stream from one or more client devices 105 to be included in a display of consolidated content.

At 320, an interface can be generated showing content being consumed by the group of shared devices. The interface may be generated, for example, by the central device 115 or server running an application for building a display of consolidated content. In embodiments, the interface may include information identifying the one or more devices within a group of shared devices, and information identifying content being displayed and/or recorded by each of the one or more devices. The interface may include thumbnails (e.g., windows or tiles) for each of the one or more devices, and thumbnail content may be displayed within each window or tile, wherein the thumbnail content is a display of content that is being displayed and/or recorded by the respective device. Thumbnail content may include one or more screenshots of the consumed content, a segment of video associated with the consumed content, or a real-time feed (e.g., secondary stream) of the content as it is being displayed and/or recorded by the respective client device.

At 325, the generated interface may be output to one or more devices. In embodiments, the interface showing content consumed by a group of shared devices may be output to an initiating client device 105, or any other display device, from the central device 115 or display generating server as a MPEG stream. For example, the interface may be received by a client device 105 when the client device 105 is tuned to a specific channel that is designated for outputting the interface. The interface may be requested by and output to a client device 105 using (HTTP) communications (e.g., HTTP GET, HTTP POST, etc.).

Figure 4:
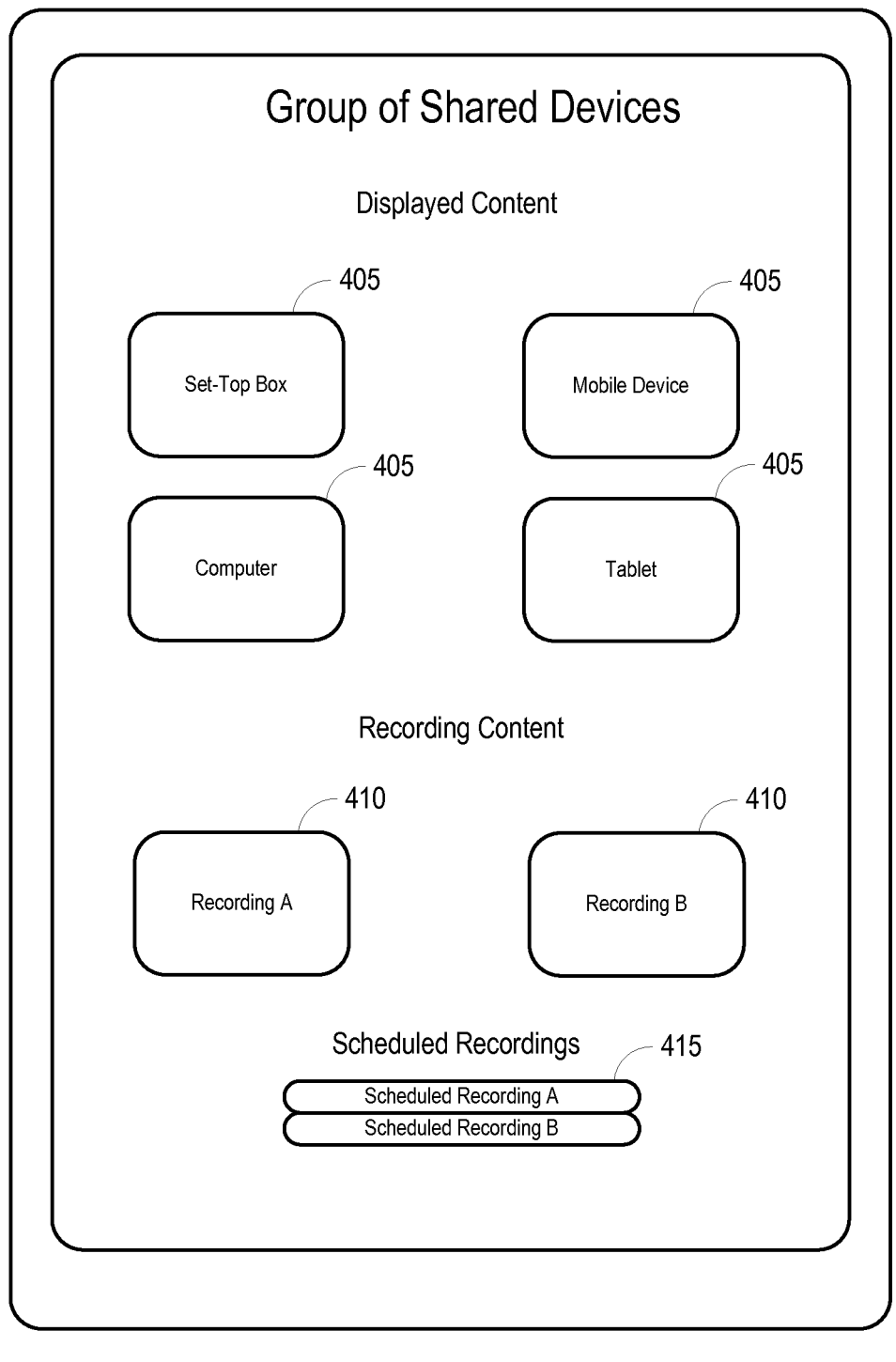
FIG. 4 is an illustration of an example interface operable to facilitate the display of a consolidation of content being consumed by a group of shared devices.

FIG. 4 is an illustration of an example interface 400 operable to facilitate the display of a consolidation of content being consumed by a group of shared devices. The interface 400 may be displayed at a client device (e.g., client device 105 of FIG. 1) or any other display device. In embodiments, the interface 400 may be displayed at a client device 105 initiating an application for viewing a consolidation of consumed content. It will be appreciated by those skilled in the relevant art that the interface 400 may be displayed to a subscriber using various interface types (e.g., non-interactive display, graphical user interface (GUI), touch-screen interface, etc.).

The interface 400 may include one or more displayed content thumbnails 405. Each of the displayed content thumbnails 405 may be associated with a device (e.g., client devices 105 of FIG. 1 such as a set-top box, mobile device, computer, tablet, etc.) that is within a group of shared devices. In embodiments, each displayed content thumbnail 405 can identify the client device with which it is associated, and can also display the content being displayed at the respective client device. For example, the content displayed within the thumbnail may be one or more screenshots of the content being displayed at the client device, a segment of video associated with the content being displayed at the client device, or a real-time feed (e.g., secondary stream) of the content as it is being displayed by the client device.

The interface 400 may include one or more recording content thumbnails 410. Each of the recording content thumbnails 410 may be associated with a device (e.g., client devices 105 of FIG. 1 such as a set-top box, mobile device, computer, tablet, etc.) that is within a group of shared devices. Each of the recording content thumbnails 410 may be associated with a device at which content is being recorded and/or a device from which a recording request is initiated. In embodiments, each recording content thumbnail 410 can identify the client device with which it is associated (e.g., the device at which the content is being recorded, the device requesting recording of the content, etc.), and can also display the content being recorded at or in response to the respective client device. For example, the content displayed within the thumbnail may be one or more screenshots of the recorded content, a segment of video associated with the recorded content, or a real-time feed (e.g., secondary stream) of the content as it is being recorded. The one or more recording content thumbnails 410 may be designated by various thumbnail characteristics such as a uniquely colored or dashed border or background.

In embodiments, the interface 400 may include a list of scheduled recordings 415. The scheduled recordings 415 may include programs that are scheduled to be recorded at a central device 115, programs that are scheduled to be recorded at one or more client devices 105 within a group of shared devices, and/or any other programs that have been scheduled to be recorded at the request of one or more client devices 105 within a group of shared devices.

Figure 5:
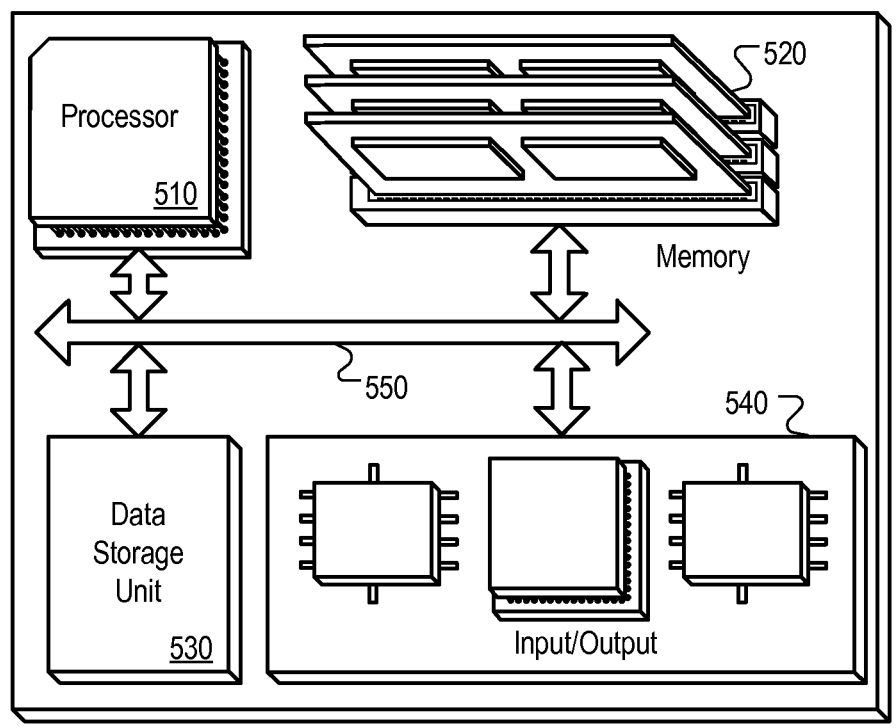
FIG. 5 is a block diagram of a hardware configuration operable to facilitate the display of a consolidation of content being consumed by a group of shared devices.

FIG. 5 is a block diagram of a hardware configuration 500 operable to facilitate the display of a consolidation of content being consumed by a group of shared devices. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g., television, computer, tablet, mobile device, etc.) or central device 115 of FIG. 1 (e.g., gateway device, cable modem, server, etc.). In embodiments, the input/output device can include driver devices configured to send communications to, and receive communications from one or more networks (e.g., local network 110 of FIG. 1, subscriber network 125 of FIG. 1, WAN 120 of FIG. 1, etc.).

Those skilled in the art will appreciate that the invention improves upon methods and systems for identifying content consumed by a group of devices. The methods, systems, and computer readable media described in this disclosure enable the generation of an interface showing content being consumed by a group of devices. A central device may gather secondary streams of content consumed by each device within the group of devices, and the secondary streams may be used to generate an interface comprising thumbnails showing content consumed by the device associated with the respective thumbnail. Secondary streams of content may be generated at the central device or may be retrieved by the central device from one or more client devices serviced by the central device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   identifying at a central device, one or more devices within a group of shared devices;
   for each respective device of the one or more devices within the group of shared devices, identifying one or more pieces of content being consumed by the respective device;
   retrieving a secondary stream of each identified piece of content consumed by one or more of the identified devices within the group of shared devices, wherein the secondary stream of each respective identified piece of content comprises video associated with the respective identified piece of content;
   generating an interface comprising one or more thumbnails, wherein each thumbnail is associated with one or more of the identified devices within the group of shared devices, and wherein a retrieved secondary stream associated with content consumed by an identified device is output as a display within a thumbnail associated with the respective device, wherein the thumbnail comprises a display of the video associated with the respective device; and
   outputting the generated interface.

2. The method of claim 1, wherein content consumed by one or more of the identified devices comprises content output from the central device to one or more of the identified devices and content being recorded at the central device.

3. The method of claim 2, wherein a content stream associated with a piece of content consumed by one or more of the identified devices is duplicated to create a secondary stream associated with the piece of content.

4. The method of claim 1, wherein content consumed by one or more of the identified devices comprises content that is received by one or more of the identified devices without passing through the central device.

5. The method of claim 4, wherein the secondary stream for each piece of content is retrieved from the one or more identified devices.

6. The method of claim 1, wherein the generated interface is output to a device as a Moving Picture Experts Group stream.

7. The method of claim 1, wherein the group of shared devices comprises a plurality of devices serviced by the central device.

8. An apparatus comprising:
a module configured to:
identify one or more devices within a group of shared devices;
for each respective device of the one or more devices within the group of shared devices, identify one or more pieces of content being consumed by the respective device;
retrieve a secondary stream of each identified piece of content consumed by one or more of the identified devices within the group of shared devices, wherein the secondary stream of each respective identified piece of content comprises video associated with the respective identified piece of content; and
generate an interface comprising one or more thumbnails, wherein each thumbnail is associated with one or more of the identified devices within the group of shared devices, and wherein a retrieved secondary stream associated with content consumed by an identified device is output as a display within a thumbnail associated with the respective device, wherein the thumbnail comprises a display of the video associated with the respective device; and
an interface configured to be used to output the generated interface.

9. The apparatus of claim 8, wherein content consumed by one or more of the identified devices comprises content output from a central device to one or more of the identified devices and content being recorded at the central device.

10. The apparatus of claim 9, wherein a content stream associated with a piece of content consumed by one or more of the identified devices is duplicated to create a secondary stream associated with the piece of content.

11. The apparatus of claim 8, wherein the secondary stream for each of one or more pieces of consumed content is retrieved from the one or more respective devices consuming the pieces of content.

12. The apparatus of claim 8, wherein the generated interface is output to a device as a Moving Picture Experts Group stream.

13. The apparatus of claim 8, wherein the group of shared devices comprises a plurality of devices serviced by a common central device.

14. One or more non-transitory computer readable media having instructions operable to cause one or more processors to perform the operations comprising:

identifying at a central device, one or more devices within a group of shared devices;
for each respective device of the one or more devices within the group of shared devices, identifying one or more pieces of content being consumed by the respective device;
retrieving a secondary stream of each identified piece of content consumed by one or more of the identified devices within the group of shared devices, wherein the secondary stream of each respective identified piece of content comprises video associated with the respective identified piece of content;
generating an interface comprising one or more thumbnails, wherein each thumbnail is associated with one or more of the identified devices within the group of shared devices, and wherein a retrieved secondary stream associated with content consumed by an identified device is output as a display within a thumbnail associated with the respective device, wherein the thumbnail comprises a display of the video associated with the respective device; and
outputting the generated interface.

15. The one or more non-transitory computer-readable media of claim 14, wherein content consumed by one or more of the identified devices comprises content output from the central device to one or more of the identified devices and content being recorded at the central device.

16. The one or more non-transitory computer-readable media of claim 15, wherein a content stream associated with a piece of content consumed by one or more of the identified devices is duplicated to create a secondary stream associated with the piece of content.

17. The one or more non-transitory computer-readable media of claim 14, wherein content consumed by one or more of the identified devices comprises content that is received by one or more of the identified devices without passing through the central device.

18. The one or more non-transitory computer-readable media of claim 17, wherein the secondary stream for each piece of content is retrieved from the one or more identified devices.

19. The one or more non-transitory computer-readable media of claim 14, wherein the generated interface is output to a device as a Moving Picture Experts Group stream.

20. The one or more non-transitory computer-readable media of claim 14, wherein the group of shared devices comprises a plurality of devices serviced by the central device.

* * * * *